US012013683B2

(12) United States Patent
Diego Gutierrez et al.

(10) Patent No.: US 12,013,683 B2
(45) Date of Patent: Jun. 18, 2024

(54) GEOMETRICAL COMPENSATIONS FOR ADDITIVE MANUFACTURING

(71) Applicant: Hewlett-Packard Development Company, L.P., Spring, TX (US)

(72) Inventors: Victor Diego Gutierrez, Sant Cugat del Valles (ES); Jordi Sanroma Garrit, Sant Cugat del Valles (ES); Manuel Freire Garcia, Sant Cugat del Valles (ES); Enrique Gurdiel Gonzalez, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 418 days.

(21) Appl. No.: 17/267,389

(22) PCT Filed: Jan. 31, 2019

(86) PCT No.: PCT/US2019/016011
§ 371 (c)(1),
(2) Date: Feb. 9, 2021

(87) PCT Pub. No.: WO2020/159508
PCT Pub. Date: Aug. 6, 2020

(65) Prior Publication Data
US 2021/0349440 A1    Nov. 11, 2021

(51) Int. Cl.
*B33Y 50/00* (2015.01)
*B22F 10/80* (2021.01)
(Continued)

(52) U.S. Cl.
CPC .......... *G05B 19/4099* (2013.01); *B22F 10/80* (2021.01); *B29C 64/386* (2017.08);
(Continued)

(58) Field of Classification Search
CPC .......... G05B 2219/35117; B33Y 50/00; G06F 2113/10
See application file for complete search history.

(56) References Cited

U.S. PATENT DOCUMENTS 9,731,452 B2   8/2017  Din et al.
10,061,870 B2  8/2018  Nelaturi et al.
(Continued)

FOREIGN PATENT DOCUMENTS

WO    WO-2018191035    10/2018

OTHER PUBLICATIONS

Wang, A., Song, S., Huang, Q., & Tsung, F. (2016). In-plane shape-deviation modeling and compensation for fused deposition modeling processes. IEEE Transactions on Automation Science and Engineering, 14(2), 968-976. (Year: 2016).*

(Continued)

*Primary Examiner* — Bijan Mapar
(74) *Attorney, Agent, or Firm* — Michael Dryja (57) ABSTRACT

In an example, a method includes receiving, at least one processor, object model data representing at least a portion of an object that is to be generated by an additive manufacturing apparatus by fusing build material within a fabrication chamber, wherein the object model data comprises a mesh model comprising data describing a surface of the object. A geometrical compensation vector may be determined for the object model data, the geometrical compensation vector having a first component applying to a first axis of the fabrication chamber and a second component applying to a second axis of the fabrication chamber. A geometrical compensation to apply to at least one location on the surface of the object may be determined by determining a product of the geometrical compensation vector and a vector indicative of the normal of the object surface at the location and the (Continued)

determined geometrical compensation may be applied to the object model data to generate modified object model data.

20 Claims, 5 Drawing Sheets

(51) Int. Cl.
    *B29C 64/386*     (2017.01)
    *G05B 19/4099*     (2006.01)
    *G06F 30/00*     (2020.01)
    *G06F 30/20*     (2020.01)
    *G06F 113/10*     (2020.01)
    *G06T 17/00*     (2006.01)

(52) U.S. Cl.
    CPC .............. *B33Y 50/00* (2014.12); *G06F 30/00* (2020.01); *G06F 30/20* (2020.01); *G06T 17/00* (2013.01); *G05B 2219/35117* (2013.01); *G05B 2219/49008* (2013.01); *G06F 2113/10* (2020.01)

(56) References Cited

U.S. PATENT DOCUMENTS

| | | |
|---|---|---|
| 10,082,989 B2 | 9/2018 | Jang et al. |
| 2017/0113414 A1 | 4/2017 | Zeng et al. |
| 2017/0310935 A1 | 10/2017 | Sinclair |
| 2018/0001567 A1 | 1/2018 | Juan et al. |
| 2018/0040131 A1* | 2/2018 | Zeng ...................... B33Y 30/00 |
| 2018/0307209 A1 | 10/2018 | Chin et al. |

OTHER PUBLICATIONS

Afazov, Shukri, et al. "A methodology for precision additive manufacturing through compensation." Precision Engineering 50 (2017): 269-274. (Year: 2017).*

Prévost, R., Whiting, E., Lefebvre, S., & Sorkine-Hornung, O. (2013). Make it stand: balancing shapes for 3D fabrication. ACM Transactions on Graphics (TOG), 32(4), 1-10. (Year: 2013).*

* cited by examiner

GEOMETRICAL COMPENSATIONS FOR ADDITIVE MANUFACTURING

CROSS-REFERENCE TO RELATED APPLICATION

Pursuant to 35 U.S.C. § 371, this application is a United States National Stage Application of PCT Patent Application Serial No. PCT/US2019/016011, filed on Jan. 31, 2019, the contents of which are incorporated by reference as if set forth in their entirety herein.

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat in a thermal fusing additive manufacturing operation. This may comprise directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise any or any combination of an infra-red light absorber, a near infra-red light absorber, a visible light absorber and/or a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices defined by parallel planes through the model. Each slice may define a portion of a respective layer of build material that is to be solidified or caused to coalesce by the additive manufacturing system.

Figure 1:
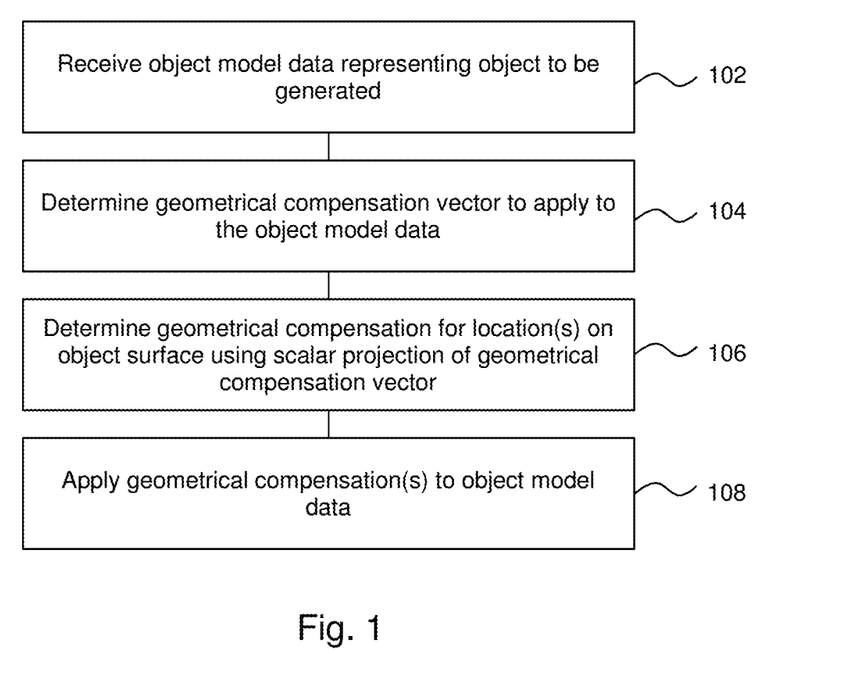
FIG. 1 is a flowchart of an example method of modifying object model data.

FIG. 1 is an example of a method, which may comprise a computer implemented method of modifying object model data. The modification of the object model data may comprise geometrical compensation in order to compensate for anticipated departures from intended dimensions when generating an object.

For example, it may be the case that when an object is generated in a process which includes heat (thermal fusing techniques), additional build material may adhere to the object on generation. For example, print agent may be associated with a region of a layer of build material. However, when fusing agent has been applied and energy is supplied, build material of neighbouring regions may become heated and fuse to the outside of the object (in some examples, being fully or partially melted, or adhering to melted build material as powder). Therefore, a dimension of an object(s) may be larger than the regions to which fusing agent is applied. In order to compensate for the fact that objects may tend to 'grow' during manufacture in this manner, the object volume as described in object model data may be reduced.

In other examples, objects may be smaller following object generation than is specified when printed. For example, some build materials used to generate objects may shrink on cooling. In order to compensate for this, object model data may be modified to increase the object volume.

A particular object may be subject to mechanisms which result in growth and shrinkage, and the actual compensation to be applied may be determined by consideration of, or may be influenced by, the different degrees by which an object may be affected by such processes.

In some examples, the modification may be specified as a scaling factor and/or an offset factor. A scaling factor may be used to multiply all specified dimensions in a direction of an axis by a value, which may be greater than 1 in order to increase the dimensions and less than 1 to reduce the dimensions. An offset factor may specify, for example by a specified distance (which may be specified in predefined units, for example addressable units such as pixels or 'voxels' as are discussed in greater detail below), an amount to add or remove from a surface of the object (or a perimeter within a layer). For example, a distance as measured in the direction of a normal from the object surface may be specified and the object may be eroded or dilated (i.e., inflated or enlarged) by this distance.

The method of FIG. 1 comprises, in block 102, receiving, at at least one processor, object model data representing at least a portion of an object that is to be generated by an additive manufacturing apparatus by fusing build material within a fabrication chamber. In some examples, the fusing process may comprise a thermal fusing process in which heat is applied. In this example, the object model data is a mesh model comprising data describing a surface of the object. For example, the mesh model may specify a plurality of vertices. Such mesh models may also be referred to as polygon models: the vertices may be joined by lines (edges) which in turn define surfaces (faces or facets) of the object. For example, a solid cube may be described by specifying the relative location in space of 8 vertices: the corners of the cube. The surfaces of the object may be defined by edges linking the nodes which travel along the surfaces. While in principle the cube could be fully described by twelve such edges defining six square surfaces, in practice it may be the case that a particular polygon, often a triangle, is used to describe the surfaces, such that a cube may be represented by twenty edges defining twelve triangles (each face of the cube being formed of two triangles).

The object model data may comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file.

The method further comprises, in block 104, determining, using at least one processor, a geometrical compensation vector to apply to the object model data, the geometrical compensation vector having a first component applying to a first axis of the fabrication chamber and a second component applying to a second axis of the fabrication chamber.

For example, the geometrical compensation may comprise a parametrical transformation, such as at least one of an offset and a scaling factor. The first and second axes may be orthogonal. For example, a geometrical compensation vector may specify components in an X and Y axis (for example to be applied in a single slice of an object), or in other examples may specify components in an X, Y and Z axis.

In some examples, a geometrical compensation vector may indicate two or three scaling factors (one for each of the two/three orthogonal dimensions) and/or two or three offset factors (one for each of the two/three orthogonal dimensions). If scaling is not indicated in a given dimension, the scaling factor in relation to that dimension may be set to 1, and if no offset is indicated in a given axis, the offset factor in relation to that axis may be set to 0.

Taking an example in which a scaling factor is specified in each of three orthogonal axes, this may be specified as a vector having components in the X, Y and Z directions, and may for example be specified as $[SF_x, SF_y, SF_z]$. This may, for example, taking the object in its intended generation orientation, mean that the 'width' of the object is to be scaled by $SF_x$, the 'depth' of the object is to be scaled by $SF_y$, and the 'height' of the object is to be scaled by $SF_z$ (noting that, in practice, the object may be generated in any orientation, and therefore the height of the object during generation may not correspond to the height of the object as orientated for use thereof following generation).

The geometrical compensation vector to apply to the object model data may be determined in a number of ways. In some examples, there may be a predetermined vector for a particular print apparatus or class of print apparatus, which may for example have been determined by trial and error over time and/or using machine learning techniques. In some examples the geometrical compensation to apply may be determined for example based on an analysis of thermal and/or material considerations and the like. The geometrical compensation vector may specify components which, on average, result in increased conformity between intended and generated object dimensions.

In other examples, geometrical compensation vector(s) may be determined in some other way. For example, there may be a plurality of defined geometrical compensation vectors, each associated with different locations within the fabrication chamber. In such examples, a particular geometrical compensation vector may be selected or determined based on the intended object generation location (for example, based on a coordinate specifying the centre of the object). It has been noted that dimensional accuracy may be significantly improved by considering the location of object generation, and different compensation vectors may be applied for different object locations to further improve accuracy.

In other examples, characteristics of the object, such as the object volume, may be taken into account. For example, bulkier objects may accrue greater thermal energy than smaller objects, and may therefore tend to 'grow' more than smaller objects.

In other examples, object generation parameter values may be considered. The parameter(s) may be any parameter which may have an impact on dimensional inaccuracy. For example, the parameter(s) may comprise any, or any combination of, environmental conditions, object generation apparatus, object generation material composition, object cooling profile or print mode. These may be specified, for example, by input to at least one processor.

Combinations of such techniques may also be used to derive geometrical transformation vectors. For the sake of the present example, it is assumed that the vector is predetermined and/or derivable from predetermined resources (for example, mapping resources such as lookup tables and the like, or through use of an algorithm or the like).

Block 106 comprises determining, using at least one processor, a geometrical compensation to apply to at least one location (and in some examples to each of a plurality of locations) on a surface of the object by determining a product of the geometrical compensation vector and a vector indicative of the normal of the object surface at the location. The location(s) may comprise at least of a defined vertex, defined edge and/or defined face of the objects. As described in greater detail below, in some examples, additional vertices may be added to the object.

In some examples, the product is an element by element product of the two vectors. This is referred to as a Hadamard product, which term will be used herein, although it is also referred to as a Shur product. Using a Hadamard product of the geometrical compensation vector and the vector indicative of the normal of the object surface at the location means that each location may be moved by a vector which is operated on based on its orientation relative to the first and second axes (and, in some examples, a third axis). In other examples, other products may be used. For example a scalar projection of the geometrical compensation vector onto the object surface normal may be used. However, the Hadamard product has been found to better preserve magnitudes in all directions, whereas a scalar projection (which may be determined using a dot product) has been found to perform less well for oblique surfaces.

Block 108 comprises applying, using at least one processor, the determined geometrical compensation to the object model data to determine modified object model data. In other words, the mesh model may be adjusted, expanded or contracted as set out by the determined geometrical compensation. In examples, the determined geometrical compensation may be applied to each of a plurality of at least one of the vertices, edges and/or faces of the object.

Examples of this are now discussed with reference to FIGS. 2A-2C.

Figure 2A:
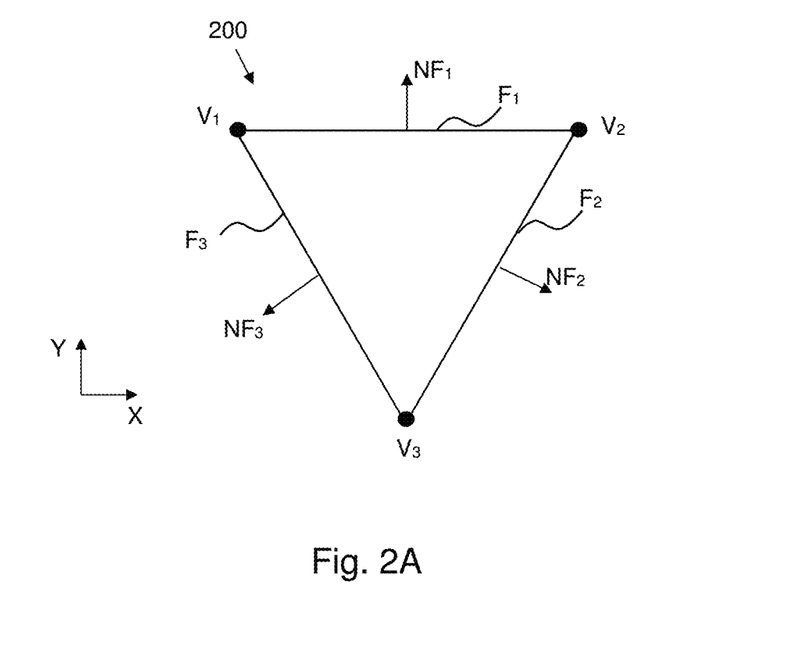
FIGS. 2A, B and C shows a visualisations of example modifications which may be applied to an object model.

FIG. 2A shows an example of a 2D slice of an object 200, and the X and Y axes are marked. The compensation vector in this example may be specified as an offset vector having the form $[O_x, O_y]$. FIG. 2 shows three vertices: $V_1$, $V_2$ and $V_3$, defining three edges, or faces in the depth of the layer, $F_1$, $F_2$, $F_3$. The faces are defined at different angles to the X and Y axes, and the outwards facing normals to the faces may be determined by reference to the coordinates used to define the vertices, and may be designated as $NF_1$, $NF_2$, $NF_3$, each having an x and y component such that the vectors may be expressed in the form $[NF_{nx}, NF_{ny}]$, where n is 1 to 3. The defined normal may then be used to determine the offset vector to be applied to each face.

This is mathematically determined using a Hadamard product, i.e. a component by component multiplication of the form $[NF_{nx}*O_x, NF_{ny}*O_y]$.

As NF1 is parallel to the Y axis, $NF_{1x}$ is 0 and the offset vector for this face may have a single component. The other faces will have X and Y components in the offset vector.

Figure 2B:
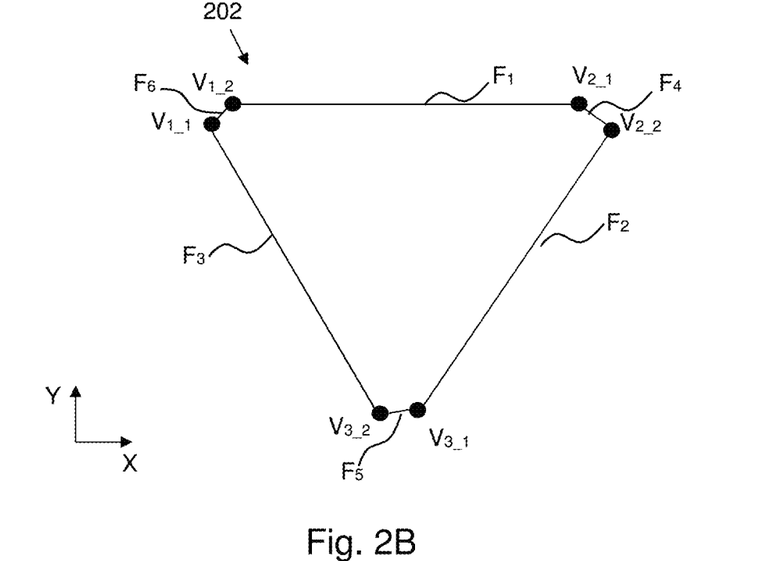

FIG. 2B shows an example in which a transformation has been applied such that the object model has been increased in size by moving the faces $F_1$, $F_2$, $F_3$ in the direction of their respective normals $NF_1$, $NF_2$, $NF_3$ to form a new object model 202. Moving the faces $F_1$, $F_2$, $F_3$ in this way results in gaps appearing therebetween. In this example, as each face is moved, its vertices maybe redefined (meaning that two vertices $V_{n\_1}$ and $V_{n\_2}$ are defined in place of a single vertex $V_n$) and new faces $F_4$, $F_5$, $F_6$ have been defined in order to close the 'hole' which may otherwise open in the model. In some examples, if the hole is small enough, it may be disregarded (i.e. new vertices need not be defined) as it may be predicted to 'close up' on fabrication.

If instead the faces are moved so as to intersect (for example, moved inwards for a convex region, or outwards for a concave region), new vertices may be defined at their intersection, and the faces redefined based on these new vertices.

In other examples, new surfaces may be defined instead of new vertices. For example, a curved surface may be defined between the repositioned vertices.

In other examples, at least one vertex may be moved instead of the faces. For example, a normal to the vertex may be determined using an average (for example a normalised average) of the angles of the faces. For example, this may be of the form:

$$\left(\frac{1}{\sum \theta_i}\right)(n_1\theta_1 + n_2\theta_2 + \dots ),$$

where θ is the internal angle of each face where it meets the vertex, and n is a surface normal.

Figure 2C:
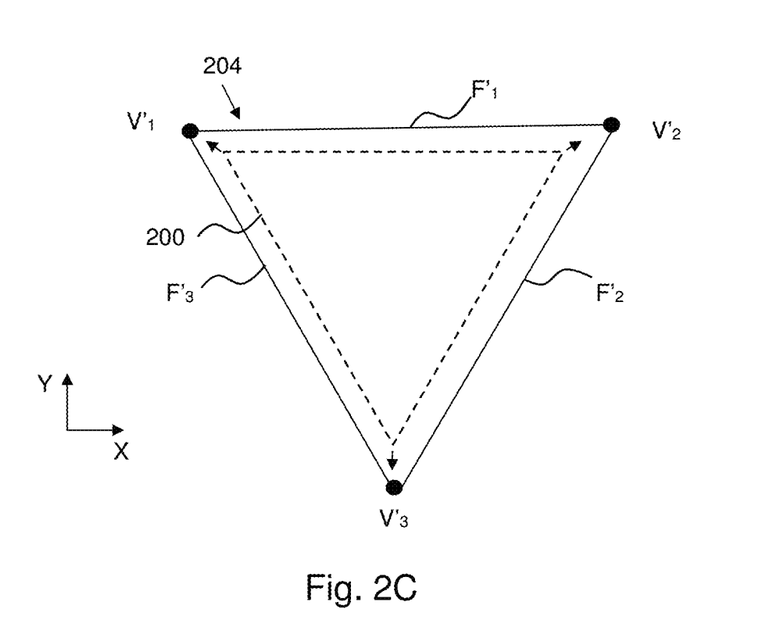

The result of such a transformation is shown in FIG. 2C. Here, the original model is shown in dotted outline, the vertices $V_1$, $V_2$ and $V_3$ are moved in the direction of the marked arrows and the expanded model 204 is defined as having three faces, $F'_1$, $F'_2$, $F'_3$ and three vertices $V'_1$, $V'_2$ and $V'_3$.

Moving the faces may generate a smother result but may be more computationally demanding due to the definition of new vertices. Therefore, moving the vertices may be used in some examples to reduce computational resources.

To consider another example in three dimensions, a three dimensional offset vector may be defined having the form $[O_x: 0.08, O_y: 0.05$ and $O_z: 0.12]$.

An example face is oriented to the bisector between the x and z axis and its normal may be defined as ($NF_x$: 0.707, $NF_y$: 0.0, $NF_z$: 0.707).

Projecting the normal vector against the offset vector yields a face offset of:

$v=(0.707,0.0,0.707)\times(0.08,0.05,0.12)=(0.056,0.0,0.084)$

Using such a process, each vertex, edge and/or triangle of the mesh may be offset in a manner which is determined in terms of its orientation in the model. This results in a modified virtual object where the modification may be applied independently of the size.

It has been proposed to apply an offset to 'voxel' models of an object (i.e. three-dimensional pixels). In such examples, the object model data may represent the object or object portion as a plurality of sub-volumes, wherein each sub-volume represents a region of the object which is individually addressable in object generation. In such examples, an offset may be applied by adding or eroding voxels form the object, and may be carried out strictly in the x, y and z directions. However, the resolution of such operations is tied to the resolution of the voxels. For example, a resolution of 600 dpi allows a uniquely addressable region of 42 by 42 microns in cross section, and thus voxels may be defined to relate to a 42 by 42 micron region. This means that adjustments may be made with a resolution at a minimum of 42 microns—and in practice, usually 84 microns as offsets may be applied symmetrically.

However, by applying the offsets to the mesh models, greater resolution may be achieved. Moreover, using the methods set out herein, the model may be adjusted 'continuously' over an entire object surface as the offset applied evolves with the angle applied.

Figure 3:
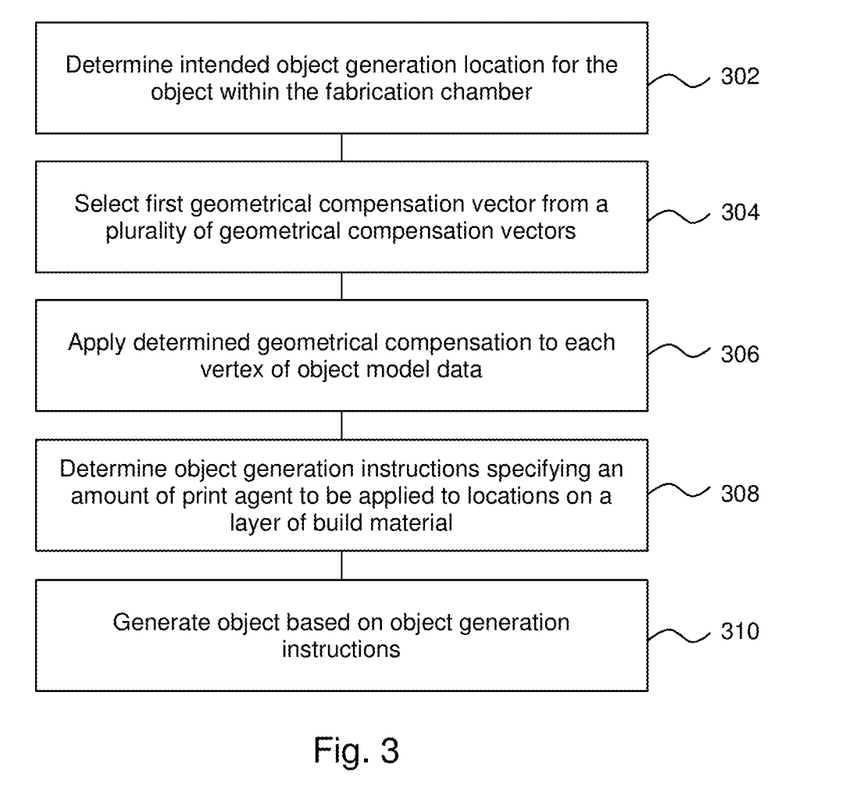
FIG. 3 is a flowchart of an example method of object generation.

FIG. 3 is an example method of object generation, comprising, in block 302, determining an intended object generation location for the object within the fabrication chamber. In one example, this may comprise a centre point of an object to be generated in additive manufacturing when the object is in its intended location within a fabrication chamber. This may comprise generating a virtual fabrication chamber, in which one or a plurality of virtual objects are arranged in the position which it is intended that the objects would occupy on generation. In this example, the centre location is a centre of mass of the object, but in another example, it may be some other location, for example the centre of a bounding box, i.e. the smallest cuboid which can fully enclose the object. In another example, a different location may be used, for example the lowermost coordinate, or any other predetermined coordinate or characterisation of the location.

Block 304 comprises selecting a first geometrical compensation vector from a plurality of geometrical compensation vectors associated with object generation locations based on the intended object generation location. For example, these may be held in at least one mapping resource which may associate a plurality of geometrical compensation vectors to locations which enclose the point location. In this example, the geometrical compensation vector comprises three offset components, each of which is associated with one of three orthogonal axes.

Block 306 comprises applying, using at least one processor, a determined geometrical compensation to each vertex of the object model data to generate modified object model data using a Hadamard product of the geometrical compensation vector with a vector indicative of the normal of that vertex. As has been set out above, the normal to a vertex may be determined by computing a normalised average of the surface normals of the faces that contain that vertex.

While in this example, the geometrical compensation vector is multiplied by the normal of the vertices and applied to the vertices, in other examples, the geometrical compensation vector is multiplied by the normal of the edges and applied to the edges, or multiplied by the normal of the faces and applied to the faces.

This therefore changes the model data to include an offset where applicable in each dimension.

Block 308 comprises determining object generation instructions (or 'print instructions') for generating the object. The object generation instructions in some examples may specify an amount of print agent to be applied to each of a plurality of locations on a layer of build material. For example, generating object generation instructions may comprise determining 'slices' of a virtual fabrication chamber modelling an intended fabrication chamber content, and rasterising these slices into pixels (or voxels, i.e. three-dimensional pixels). An amount of print agent (or no print agent) may be associated with each of the pixels/voxels. For example, if a pixel relates to a region of a fabrication chamber which is intended to solidify, the object generation instructions may be generated to specify that fusing agent should be applied to a corresponding region of build material in object generation. If however a pixel relates to a region of the fabrication chamber which is intended to remain unsolidified, then object generation instructions may be generated to specify that no agent, or a coalescence modifying agent such as a detailing agent, may be applied thereto. In addition, the amounts of such agents may be specified in the generated instructions and these amounts may be determined based on, for example, thermal considerations and the like.

Block 310 comprises generating an object based on the object generation instructions. For example, such an object may be generated layer by layer. This may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using printheads operated according to inkjet principles of two dimensional printing to apply print agents, which in some examples may be controlled to apply print agents with a resolution of around 600 dpi, or 1200 dpi. A further layer of build material may then be formed and the process repeated, for example with the object generation instructions for the next slice.

In this way, the object once formed may end up being closer to an intended size.

In some examples, the methods set out herein may be combined with other methods of object model modification. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

Figure 4:
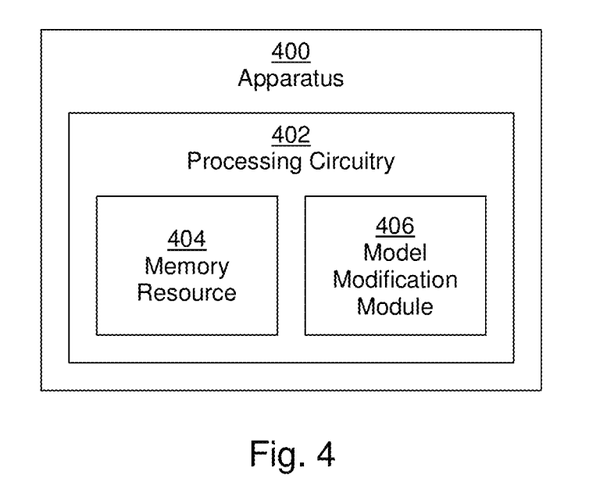
FIGS. 4 and 5 are simplified schematic drawings of example apparatus for additive manufacturing.

FIG. 4 shows an apparatus 400 comprising processing circuitry 402. The processing circuitry 402 comprises a memory resource 404 and a model modification module 406.

The memory resource 404 in this example, and in use of the apparatus 400, stores at least one parametrical transformation vector to compensate for object deformation in additive manufacturing. In some examples, there may be a plurality of vectors stored in the memory resource 404 which relate to different object placement locations within a fabrication chamber. For example these may comprise any of the features of the geometrical compensation vectors described above. The parametrical transformation vector(s) may comprise geometrical transformation value(s), for example scale and/or offset value(s).

The model modification module 406, in use of the apparatus 400, determines a plurality of parametrical transformations for an object to be generated using additive manufacturing using a product of a parametrical transformation vector retrieved from the memory resource 404 and a vector indicative of the normal of the object's surface at each of a plurality of surface locations and to modify object model data describing the object using the parametrical transformations. The products may for example comprise Hadamard products or scalar projections as discussed above. Where a plurality of parametrical transformation vectors are stored in the memory resource 404, the parametrical transformation vector(s) retrieved for use by the model modification module 406 may for example be selected based on an intended location of object generation.

Figure 5:
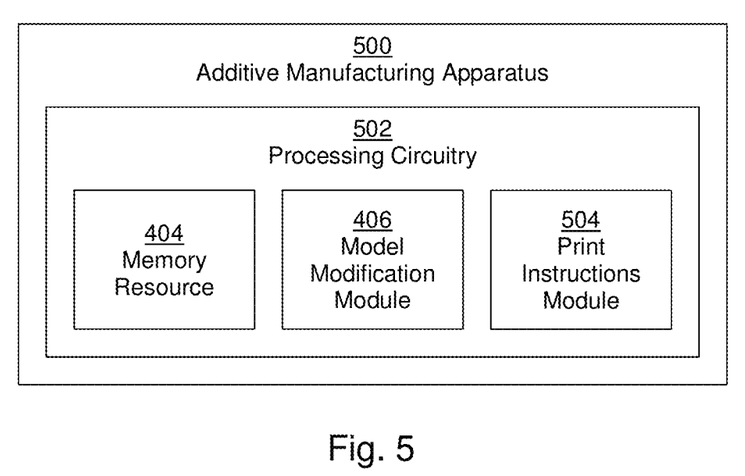

FIG. 5 shows additive manufacturing apparatus 500 to generate an object comprising processing circuitry 502. The processing circuitry 502 comprises the memory resource 404 and the model modification module 406 of FIG. 4 and further comprises a print instructions module 504.

The print instructions module 504, in use of the apparatus 500, determines print instructions (or object generation instructions) for generating the object from the modified object model data.

The additive manufacturing apparatus 500, in use thereof, generates the object in a plurality of layers (which may correspond to respective slices of an object model) according to print instructions. The additive manufacturing apparatus 500 may for example generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. The additive manufacturing apparatus 500 may comprise additional components not shown herein, for example any or any combination of a fabrication chamber, a print bed, printhead(s) for distributing print agents, a build material distribution system for providing layers of build material, energy sources such as heat lamps and the like.

The generated print instructions may, in use thereof, control the additive manufacturing apparatus 500 to generate each of a plurality of layers of the object. This may for example comprise specifying area coverage(s) for print agents such as fusing agents, colorants, detailing agents and the like. In some examples, object generation parameters are associated with object model sub-volumes. In some examples, other parameters, such as any, or any combination of heating temperatures, build material choices, an intent of the print mode, and the like, may be specified. In some examples, halftoning may be applied to determined object generation parameters to determine where to place fusing agent or the like. The print instructions may be specified in association with sub-volumes ('voxels'). In some examples, the print instructions comprise a print agent amount associated with sub-volumes.

The processing circuitry 402, 502 or the modules thereof may carry out any of the blocks of FIG. 1, or any of block 302 to 308 of FIG. 3.

Figure 6:
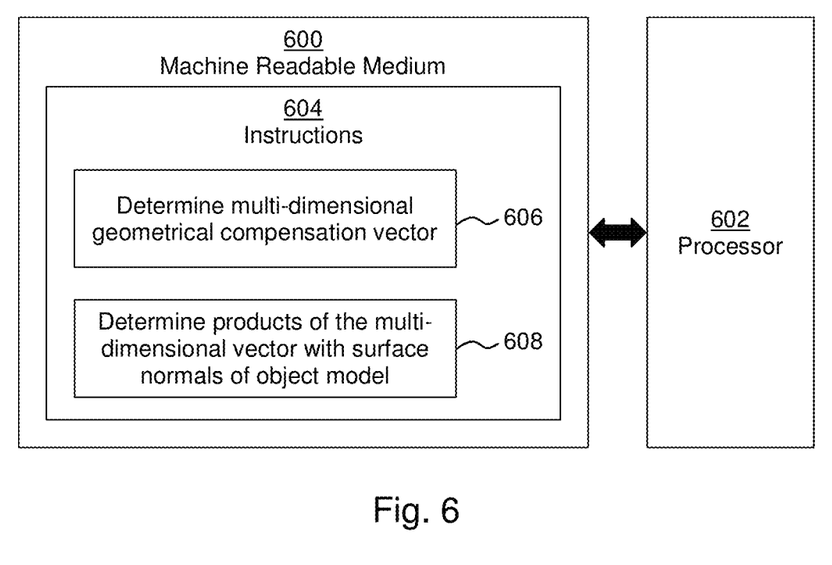
FIG. 6 is a simplified schematic drawing of an example machine-readable medium associated with a processor.

FIG. 6 shows a tangible machine-readable medium 600 associated with a processor 602. The machine-readable medium 600 comprises instructions 604 which, when executed by the processor 602, cause the processor 602 to carry out tasks. In this example, the instructions 604 comprise instructions 606 to cause the processor 602 to determine a multi-dimensional geometrical compensation vector for an object model for use in additive manufacturing, the object model comprising a mesh model of an object. Determining the multi-dimensional geometrical compensation vectors may comprise selecting and/or retrieving a multi-dimensional geometrical compensation vector from a memory resource. In this example, the instructions 604 further comprise instructions 608 to cause the processor 602 to determine a plurality of vector products (e.g. a dot product in a scalar projection, or a Hadamard product) of the multi-dimensional geometrical compensation vector with vectors which are orthogonal to the object surface for each of a plurality of locations on the surface, wherein the plurality of products are for modifying the object model. In some examples, the instructions 604 comprise instructions which when executed cause the processor 602 to apply the determined plurality of products to corresponding locations described in a data model representing the object.

In some examples, the instructions when executed cause the processor 602 to carry out any of the blocks of FIG. 1 or any of block 302 to 308 of FIG. 3. In some examples, the instructions may cause the processor 602 to act as any part of the processing circuitry 502 of FIG. 5 or FIG. 6.

Figure 7:
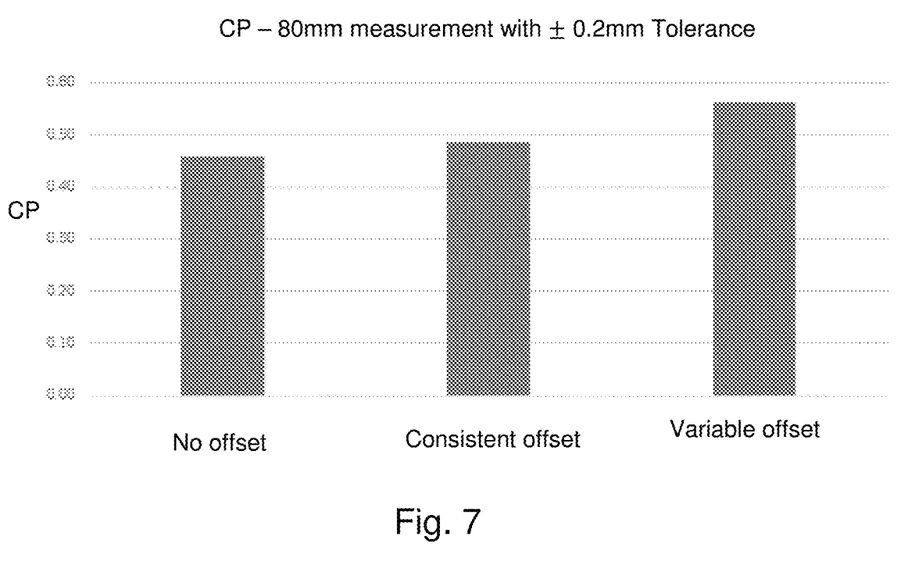
FIG. 7 shows comparative examples of additive manufacturing processes.

FIG. 7 shows the process capability measure CP which provides a statistical measure of the ability of an additive manufacturing process to produce output within specification limits, in this example a 0.2 mm tolerance. A higher CP value is indicative of an improved performance. The first bar shows the CP value for an additive manufacturing apparatus in which no geometrical modification is applied. The second bar shows an example in which a constant offset has been applied in each dimension. The third bar shows an example in which the method set out herein have been used to determine a variable offset (i.e. an offset which varies with the direction of the surface). In this example, the data is based on 132 generated test objects, each test object corresponding to the same original object model data.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the model modification module 406 and/or the print instructions module 504) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving, by a processor, object model data representing an object to be generated by an additive manufacturing apparatus by selectively fusing build material within a fabrication chamber, the object model data comprising a mesh model including data describing a first and second planar faces of the object;
determining, by the processor, a geometrical compensation vector for the object model data, the geometrical compensation vector having components for respective orthogonal axes of the fabrication chamber;
determining, by the processor, a first geometrical compensation for the first planar face as a product of the geometrical compensation vector and a first normal vector of the first planar face;
determining, by the processor, a second geometrical compensation for the second planar face as a product of the geometrical compensation vector and a second normal factor of the second planar face;
generating by the processor, modified object model data, including:
applying the first geometrical compensation to one or more locations on the first planar face;
applying the second geometrical compensation to one or more locations on the second planar face; and
causing, by the processor, the additive manufacturing apparatus to generate the object in accordance with the modified object model data.

2. The method according to claim 1, wherein the components of the geometrical compensation vector specify offsets for the respective orthogonal axes.

3. The method according to claim 1, further comprising:
determining, by the processor, an intended object generation location for the object within the fabrication chamber; and
selecting, by the processor and from a plurality of corresponding geometrical compensation vectors associated with different object generation locations within the fabrication chamber, the geometrical compensation vector for the object model data, as the corresponding geometrical compensation vector associated with the intended object generation location.

4. The method according to claim 1, further comprising:
determining, by the processor, object generation instructions for generating the object, the object generation instructions specifying an amount of print agent to be applied to each of a plurality of locations on a layer of build material,
and wherein causing the additive apparatus to generate the object in accordance with the modified object model data comprises:
causing the additive manufacturing apparatus to generate the object using the object generation instructions.

5. The method according to claim 1, wherein the data of the mesh model further describes a vertex at an intersection between the first and second planar faces,
wherein application of the first and second geometrical compensations to the first and second planar faces moves the face and second planar faces outward along the first and second normal vectors, respectively,
and wherein generating the modified object model data further includes:
adding a new face having first and second vertices to the mesh model, the first vertex at an intersection between the new face and the first planar face after application of the first geometrical compensation, the second vertex at an intersection between the new face and the second planar face after application of the second geometrical compensation; and
replacing the vertex within the mesh model with the first and second vertices.

6. The method according to claim 1, wherein the data of the mesh model further describes a vertex at an intersection between the first and second planar faces,
wherein application of the first and second geometrical compensations to the first and second planar faces moves the face and second planar faces inward along directions opposite to the first and second normal vectors, respectively,
and wherein generating the modified object model data further includes:
defining a new vertex at an intersection between the first planar face after application of the first geometrical compensation and the second planar face after application of the second geometrical compensation; and
replacing the vertex within the mesh model with the new vertex.

7. A non-transitory computer-readable data storage medium storing program code executable by a processor to perform processing comprising:
receiving object model data representing an object to be generated by an additive manufacturing apparatus by selectively fusing build material within a fabrication chamber, the object model data comprising a mesh model including data describing a first and second planar faces of the object;
determining a geometrical compensation vector for the object model data, the geometrical compensation vector having components for respective orthogonal axes of the fabrication chamber;
determining a first geometrical compensation for the first planar face as a product of the geometrical compensation vector and a first normal vector of the first planar face;

determining a second geometrical compensation for the second planar face as a product of the geometrical compensation vector and a second normal factor of the second planar face;

generating modified object model data, including:
applying the first geometrical compensation to one or more locations on the first planar face;
applying the second geometrical compensation to one or more locations on the second planar face; and
causing the additive manufacturing apparatus to generate the object in accordance with the modified object model data.

8. The non-transitory computer-readable data storage medium according to claim 7, wherein the components of the geometrical compensation vector specify offsets for the respective orthogonal axes.

9. The non-transitory computer-readable data storage medium according to claim 7, wherein the processing further comprises:
determining an intended object generation location for the object within the fabrication chamber; and
selecting, from a plurality of corresponding geometrical compensation vectors associated with different object generation locations within the fabrication chamber, the geometrical compensation vector for the object model data, as the corresponding geometrical compensation vector associated with the intended object generation location.

10. The non-transitory computer-readable data storage medium according to claim 7, wherein the processing further comprises:
determining object generation instructions for generating the object, the object generation instructions specifying an amount of print agent to be applied to each of a plurality of locations on a layer of build material,
and wherein causing the additive apparatus to generate the object in accordance with the modified object model data comprises:
causing the additive manufacturing apparatus to generate the object using the object generation instructions.

11. The non-transitory computer-readable data storage medium according to claim 7, wherein the data of the mesh model further describes a vertex at an intersection between the first and second planar faces,
wherein application of the first and second geometrical compensations to the first and second planar faces moves the face and second planar faces outward along the first and second normal vectors, respectively,
and wherein generating the modified object model data further includes:
adding a new face having first and second vertices to the mesh model, the first vertex at an intersection between the new face and the first planar face after application of the first geometrical compensation, the second vertex at an intersection between the new face and the second planar face after application of the second geometrical compensation; and
replacing the vertex within the mesh model with the first and second vertices.

12. The non-transitory computer-readable data storage medium according to claim 7, wherein the data of the mesh model further describes a vertex at an intersection between the first and second planar faces,
wherein application of the first and second geometrical compensations to the first and second planar faces moves the face and second planar faces inward along directions opposite to the first and second normal vectors, respectively,
and wherein generating the modified object model data further includes:
defining a new vertex at an intersection between the first planar face after application of the first geometrical compensation and the second planar face after application of the second geometrical compensation; and
replacing the vertex within the mesh model with the new vertex.

13. A system comprising:
a processor; and
a memory storing program code executable by the processor to perform processing comprising:
receiving object model data representing an object to be generated by an additive manufacturing apparatus by selectively fusing build material within a fabrication chamber, the object model data comprising a mesh model including data describing a first and second planar faces of the object;
determining a geometrical compensation vector for the object model data, the geometrical compensation vector having components for respective orthogonal axes of the fabrication chamber;
determining a first geometrical compensation for the first planar face as a product of the geometrical compensation vector and a first normal vector of the first planar face;
determining a second geometrical compensation for the second planar face as a product of the geometrical compensation vector and a second normal factor of the second planar face;
generating modified object model data, including:
applying the first geometrical compensation to one or more locations on the first planar face;
applying the second geometrical compensation to one or more locations on the second planar face; and
causing the additive manufacturing apparatus to generate the object in accordance with the modified object model data.

14. The system according to claim 13, wherein the components of the geometrical compensation vector specify offsets for the respective orthogonal axes.

15. The system according to claim 13, wherein the processing further comprises:
determining an intended object generation location for the object within the fabrication chamber; and
selecting, from a plurality of corresponding geometrical compensation vectors associated with different object generation locations within the fabrication chamber, the geometrical compensation vector for the object model data, as the corresponding geometrical compensation vector associated with the intended object generation location.

16. The system according to claim 13, wherein the processing further comprises:
determining object generation instructions for generating the object, the object generation instructions specifying an amount of print agent to be applied to each of a plurality of locations on a layer of build material,
and wherein causing the additive apparatus to generate the object in accordance with the modified object model data comprises:

causing the additive manufacturing apparatus to generate the object using the object generation instructions.

17. The system according to claim 13, wherein the data of the mesh model further describes a vertex at an intersection between the first and second planar faces,
wherein application of the first and second geometrical compensations to the first and second planar faces moves the face and second planar faces outward along the first and second normal vectors, respectively,
and wherein generating the modified object model data further includes:
adding a new face having first and second vertices to the mesh model, the first vertex at an intersection between the new face and the first planar face after application of the first geometrical compensation, the second vertex at an intersection between the new face and the second planar face after application of the second geometrical compensation; and
replacing the vertex within the mesh model with the first and second vertices.

18. The system according to claim 13, wherein the data of the mesh model further describes a vertex at an intersection between the first and second planar faces,
wherein application of the first and second geometrical compensations to the first and second planar faces moves the face and second planar faces inward along directions opposite to the first and second normal vectors, respectively,
and wherein generating the modified object model data further includes:
defining a new vertex at an intersection between the first planar face after application of the first geometrical compensation and the second planar face after application of the second geometrical compensation; and
replacing the vertex within the mesh model with the new vertex.

19. The system according to claim 13, wherein the processor and memory are part of a device separate from the additive manufacturing apparatus.

20. The system according to claim 13, wherein the additive manufacturing apparatus is part of the system.

\* \* \* \* \*